es GERMICIDAL COMPOSITIONS CONTAINING
COMPLEXES OF IODINE
John C. Hagerty, Webster Groves, Mo., assignor to W. R. Grace & Co., New York, N.Y., a corporation of Connecticut
No Drawing. Filed May 26, 1965, Ser. No. 459,111
13 Claims. (Cl. 107—70)

This invention relates to preparations for controlling microorganisms, particularly bacteria, fungi, and molds. More particularly, the invention relates to compositions wherein iodine is complexed with certain anionic surface active agents; or with a mixture of said anionic surface active agents and certain nonionic surface active agents.

Iodine is recognized as an excellent bactericide. However, it cannot be efficiently used in its free form because of its high vapor pressure resulting in excessive loss of the free iodine when applied to control microorganisms. In view of its poor solubility in water (only 0.0162 part of iodine dissolve in 100 parts of water at 0° C. and 0.09566 part of iodine dissolve in 100 parts of water at 60° C.), it cannot be used in the form of an aqueous solution. A solution of iodine in the common water miscible solvents for iodine, such as acetone, ethyl alcohol, methyl alcohol, glycols and glycerol, cannot be used effectively to control microorganisms because in water much of the iodine will be precipitated promptly and is lost in aqueous dilution of the solution without exercising its germicidal action. The addition of an iodine solution in a water immiscible solvent, such as carbon tetrachloride, benzene and ether, to water containing microorganisms does not result in control of the microorganisms because little of the iodine dissolves in the water, the amount thus dissolved being limited by the solubility of iodine in water which as above noted is very small.

It has been proposed to produce iodine complexes, i.e., to incorporate iodine in a surface active agent or detergent, usually referred to as an iodine carrier. These complexes, when added to aqueous media, gradually release the iodine as free iodine so that it is germicidally effective. While a number of nonionic surface active agents, particularly those in the form of polyoxyalkylene condensates, are effective carriers for iodine, it has previously been established that not all surface active agents falling within the anionic grouping are suitable as iodine carriers. In fact anionic surface active agents are generally not capable of providing stable iodine formulations. One exception to this general observation is found in the alkyl aryl sulfonates, such as alkyl benzene sodium sulfonate and alkyl naphthyl sodium sulfonate, iodine complexes of which are disclosed and claimed in United States Patent No. 2,977,278. Iodine complexes with anionic alkanoyl taurates have been disclosed in United States Patent 3,039,916.

It has now been discovered that iodine can be complexed with a further class of anionic surface active agents to provide anionic carrier-iodine complexes readily adapted for the uses to which previous complexes have been put. It has further been discovered that these new anionic carrier-iodine complexes can be mixed with a particular class of known nonionic carrier-iodine complexes to provide, in use dilutions, germicidal compositions generally equivalent to and sometimes better than any of the present major commercial products of this type.

The anionic surface active agents useful for the purposes of the present invention are most conveniently represented by the general formula:

$$RCH_2O(CH_2CH_2O)_nSO_3X$$

wherein:

R is a hydrocarbon alkyl radical containing from about 7 to about 19 carbon atoms preferably about 9 to about 15 carbon atoms;
X is an alkali metal cation, an ammonium cation, or the triethanolamine cation, and
n is a number of from about 2 to about 30, preferably 2 to about 10.

The anionic surface active agents in this general class are (perhaps inaccurately) usually referred to as alkyl ether sulfate salts. In general these materials and methods for preparing them are known to the art. Several representative examples are ammonium lauryl ether sulfate, sodium lauryl ether sulfate, potassium lauryl ether sulfate, ammonium stearyl ether sulfate, sodium stearyl ether sulfate and the like. The most preferred anionic surface active agents are the alkali metal, ammonium or triethanolammonium lauryl ether sulfates. Most especially preferred is the commercially available (Maprofix MB) ammonium lauryl ether sulfate which contains about 3 oxyethylene $(CH_2CH_2O)$ groups.

In preparing the new anionic carrier-iodine complexes, elemental iodine can be dissolved directly in the carrier if liquid, or in a heated carrier if it can be liquified by moderate heating above room temperature. If the carrier is a solid, such carrier can be dissolved in water to form a concentrated aqueous solution and the elemental iodine added thereto effect complexing.

The amount of iodine complexed with the anionic carrier can be within the range of about 0.1 to about 30% and preferably is from about 1 to about 3% based on the weight of the surface active agent. It will be understood, however, that the preferred concentration of iodine in the complex may vary somewhat from the stated range depending upon the particular type of use preparation desired for controlling microorganisms.

The anionic carrier-iodine complex can, if desired, be utilized directly in preparing use dilutions in aqueous media containing iodine concentrations suitable for controlling microorganisms, i.e. from about 5 to 10 p.p.m. up to several hundred p.p.m., depending upon the intended use and the quantity of microorganisms to be destroyed. Alternatively, the preparations may be partially diluted or extended with water or other solvent media, or with a water soluble extender which is inert to iodine, such as urea, to provide practical concentrates for distribution which in turn are diluted by the ultimate consumer to provide the final aqueous use solutions. Likewise the preparation may be diluted or extended with compatible acids for the purpose of stabilizing and thus extending the germicidal activity of the complex. Such concentrates can suitably contain from about 0.1 to about 50% or more of the anionic carrier-iodine preparation, having regard for convenience in packaging and intended dilution by the user in preparing use solutions.

In the presently preferred embodiment of this invention a detergent carrier-iodine complex is formed from a mixture of an anionic surface active agent of the class previously described with from about 2 to about 10 parts by weight and preferably about 3 to 5 parts by weight (based on the weight of the anionic surface active agent) of a nonionic surface active agent of the class generically known as polyoxyethylene sorbitan fatty acid esters. Representative examples of such nonionic surface active agents are oxyethylated sorbitan monolaurate, oxyethylated sorbitan monopalmitate, oxyethylated sorbitan monostearate, oxyethylated sorbitan monooleate and the like. In general, the preferred nonionic surface active agents are those containing an average of from about 10 to about 50 oxyethylene $—(CH_2CH_2O)—$ groups per molecule (most preferably 15 to 30 oxyethylene groups) and wherein the acid moiety of said ester is derived from a fatty acid containing from about 8 to about 18 carbon atoms (most preferably about 10 to about 14 carbon atoms). The most particularly preferred nonionic surface active agent is commercially available (Tween 20) polyoxyethylene (20) sorbitan monolaurate, containing an average of about 20 oxyethylene $-(CH_2CH_2O)-$ groups per molecule. The nonionic ester-iodine complexes contain from about 0.1 to about 30%, preferably about 1 to about 3% by weight of complexed iodine, based on the weight of the ester.

The general procedures for preparing iodine complexes of the mixtures of surface active agents is the same as that described hereinabove for the novel anionic carrier-iodine complexes of this invention.

The following example provides a better understanding of the presently preferred germicidal composition of the present invention. It is to be understood that the example is given by way of illustration and not of limitation.

EXAMPLE

A germicidal detergent having the following formulation was prepared:

Ingredient: Weight percent
Polyoxyethylene sorbitan monolaurate [1] _____ 17.0
(30% aqueous solution) ammonium lauryl ether sulfate [2] _____ 15.0
Iodine 99.8% _____ 1.1
Hydrochloric acid—3 normal_____ 0.8
Lauryl diethanolamide [3] _____ 5.0
Water (deionized) to_____ 100.0

[1] Commercial product having average of 20 oxyethylene $-(CH_2CH_2O)-$ groups per molecule.
[2] Commercial product having average of 3 oxyethylene $-(CH_2CH_2O)-$ groups per molecule.
[3] Thickener, foam stabilizer and lubricity enhancer.

The polyoxyethylene sorbitan monolaurate, the ammonium lauryl ether sulfate and sufficient water to reach 20 percent of the batch size by weight are charged into a vessel and heated to 150° Fahrenheit with agitation. The hydrochloric acid is then added. The iodine is then added and agitation and heating to 150° Fahrenheit are continued for 45 minutes. The lauryl diethanolamide is then charged and agitation is continued to incorporate this amide while the batch is allowed to cool. The batch is then filtered and pH adjusted if necessary. The product recovered contained 26.5 weight percent solids. It had a pH of about 4.5, a specific gravity (at 25° centigrade) of 1.034; an available iodine content of 0.75 percent by weight. For the purposes of the following tests this product was identified as Formula 37B.

Formula 37B was compared with two of the leading commercially available iodine surgical scrub formulations.

The first comparison was made on the basis of general washing characteristics, available iodine stability and cleaning efficiency.

The following preliminary determinations were made on the competitive commercial material.

| Product | pH | Available I$_2$ (weight percent) | Non-Volatile Material (weight percent) |
|---|---|---|---|
| Commercial Product A | 5.2 | 0.594 | 26.63 |
| Commercial Product B | 4.0 | 0.953 | 24.56 |

The available iodine was determined by titration with 0.1 Normal sodium thiosulfate.

The non-volatile content was determined by oven drying at 105° centigrade for two hours.

Fourteen subjects participated in the general washing characteristics test. Each subject first washed with 5 milliliters of a 12.5 percent active vegetable oil soap to remove the natural oils normally found on the skin. If these oils were not so removed, the washing characteristics of the first product tested would be affected while subsequent products tested would be unaffected. The subject rinsed his hands thoroughly and again wet his hands. At this time, 5 milliliters of the iodine formulation to be tested was transferred by pipette into the palms of the subject's hands. The subjects then washed, without adding additional water, for one minute and commented on the following general characteristics: foam, flash foam, feel, after feel, rinsing and staining.

The following lists contain the six characteristics examined and the ratings for each:

Foam and flash foam:
(a) Excellent
(b) Good
(c) Fair
(d) Poor
(e) None
Rinsability:
(a) Free
(b) ____
(c) Fair
(d) Slow
(e) Hard to rinse
Feel and after feel:
(a) Excellent
(b) Good
(c) Fair—OK
(d) Greasy—slightly slimy
(e) Very slimy
Staining:
(a) None
(d) Slight staining
(e) Severe staining The numbers in the following Table I indicate the number of subjects assigning the noted rating for each characteristic.

TABLE I.—GENERAL WASHING CHARACTERISTICS

| Product | Flash Foam | Foam | Feel | After Feel | Rinsing | Staining |
|---|---|---|---|---|---|---|
| Formula 37B | (a) 1 | 4 | 1 | 1 | 13 | 14 |
| | (b) 12 | 9 | 4 | 3 | 0 | 0 |
| | (c) 1 | 1 | 9 | 10 | 1 | 0 |
| | (d) 0 | 0 | 0 | 0 | 0 | 0 |
| | (e) 0 | 0 | 0 | 0 | 0 | 0 |
| Commercial Product A | (a) 1 | 1 | 0 | 0 | 0 | 14 |
| | (b) 12 | 10 | 6 | 4 | 14 | 0 |
| | (c) 1 | 2 | 7 | 9 | 0 | 0 |
| | (d) 1 | 1 | 1 | 1 | 0 | 0 |
| | (e) 0 | 0 | 0 | 0 | 0 | 0 |
| Commercial Product B | (a) 0 | 0 | 0 | 0 | 0 | 10 |
| | (b) 0 | 0 | 0 | 0 | 3 | 0 |
| | (c) 0 | 0 | 4 | 1 | 1 | 0 |
| | (d) 1 | 1 | 3 | 9 | 10 | 3 |
| | (e) 13 | 13 | 7 | 3 | 0 | 1 |

The washing order was Commercial Product A, Commercial Product B, and Formula 37B.

Six subjects participated in the cleaning efficiency test. In this test each subject placed a glove on one hand and rubbed 3 milliliters of a synthetic soil over the bare hand.

This was done until the hand was completely cover to the wrist with the soil. The hand was then wet and the subject washed for one minute with 5 milliliters of the test product. The glove was removed after rinsing and patting the hand dry. A glove was then placed on the other hand and a second product was tested on the previously covered hand in the same manner.

*Synthetic soil composition*

| Material: | Grams |
|---|---|
| Motor oil SAE 10W | 25.0 |
| Mineral oil USP #35 | 25.0 |
| Commercial shortening | 25.0 |
| Carbon black | 5.0 |
| Commercial clay | 50.0 |
| Deodorized kerosene | 25.0 |

First, the right hand was washed with Commercial Product A while the left hand was washed with Formula 37B. On the following day, the right hand was washed with Commedcial Product B and the left hand was washed with Formula 37B.

The results of all six subjects were the same. Formula 37B (the product of this invention) left the hands significantly cleaner than did Commercial Product B. This was particularly evident around the fingernails and in the follicles of the hair on the back of the hand. The soil retention rating for Formula 37B was "slight," while the rating for Commercial Product B was "moderate." When Commercial Product A was compared to Formula 37B, the results indicated that the former left the hands slightly cleaner. The soil retention rating for both products was "slight."

The available iodine stability testes were run at 50° centrigrade and at room temperature (about 25° centigrade). The available iodine was determined by titration with 0.1 normal sodium thiosulfate. The samples were stored in closed glass containers. Results of these tests appear in Tables II and III below:

TABLE II.—WEIGHT PERCENT AVAILABLE IODINE

| Storage Time (Days) at 50° Centrigrade | Formula 37B | Commercial Product A | Commercial Product B |
|---|---|---|---|
| 0 | 0.74 | 0.70 | 0.95 |
| 2 | | 0.67 | |
| 7 | 0.60 | | 0.36 |
| 11 | | 0.60 | |
| 15 | 0.55 | 0.59 | 0.26 |

TABLE III.—WEIGHT PERCENT AVAILABLE IODINE

| Storage Time (Days) at Room Temperature | Formula 37B | Commercial Product A | Commercial Product B |
|---|---|---|---|
| 0 | 0.74 | 0.59 | 0.95 |
| 7 | 0.74 | 0.59 | 0.94 |
| 15 | 0.74 | 0.59 | 0.91 |

Five subjects participated in a second hand-washing test on Formula 37B. The procedure followed was the one recommended by the manufacturer of Commercial Product A (the leading commercial iodine surgical scrub) and was as follows:

Wet hands with water. Pour 5 cubic centimeters of surgical scrub on the palm of the hands and spread over both hands. Without adding more water, rub the scrub over all areas for five minutes. Clean thoroughly under fingernails with an orange stick. Add a little water and develop copious suds. Rinse thoroughly under running water. Complete the wash by scrubbing with another 5 cubic centimeters of surgical scrub in the same way.

The subjects were scrubbed three times a day by the above procedure. After the first washing of the day, surcial gloves were worn for two hours. At the end of this period each subject's hands were washed with a bland (non-medicated) soap in two liters of water held in a wash basin. The wash water, which contains any bacteria removable by the bland soap is diluted, and 10 milliliter aliquots are added to agar. The number of colonies of bacteria resulting give a quantitative measurement of the number of microorganisms present in the wash water and thus a quantitative estimation of the total number of bacteria removable from the subject's hands.

The nails were cleaned only in the first wash of the day. During this test, staining and irritation observations were also made. The results with Formula 37B are shown in Table IV below. The results of the same test (except for the use of three different test subjects together with three test subjects from the test on Formula 37B) performed with Commercial Product A, are shown in Table V below. Table VI gives the average percent reduction obtained with each product on each of the test days. In Tables IV and V the result shown for the first day under the "microorganisms per 10 milliliters" column represents the normal number of bacteria removable from the subjects' hands using a bland soap wash. The data shown for later days reflects the influence of three scrubs per day with medicated soap.

TABLE IV.—FORMULA 37B

| Subject | Day | Basin Water, Organisms per 10 milliliters | Percent Reduction | Staining [1] | Irrigation |
|---|---|---|---|---|---|
| A | 1 | 1,180 | | None | None. |
|   | 2 | 26 | 97.8 | do | Do. |
|   | 3 | 1 | 99.92 | do | Do. |
|   | 4 | 1 | 99.92 | Slight | Do. |
|   | 5 | 0 | 100.00 | Moderate | Do. |
| B | 1 | 6,190 | | None | Do. |
|   | 2 | 425 | 93.1 | do | Do. |
|   | 3 | 57 | 99.1 | do | Do. |
|   | 4 | 37 | 99.4 | Slight | Do. |
|   | 5 | 34 | 99.5 | do | Do. |
| C | 1 | 23,040 | | None | Do. |
|   | 2 | 2,588 | [2] 88.8 | do | Do. |
|   | 3 | 213 | 99.1 | do | Do. |
|   | 4 | 198 | 99.1 | do | Do. |
|   | 5 | 180 | 99.2 | do | Do. |
| D | 1 | 1,140 | | do | Do. |
|   | 2 | 24 | 97.9 | do | Do. |
|   | 3 | 3 | 99.7 | do | Do. |
|   | 4 | 2 | 99.8 | do | Do. |
|   | 5 | 1 | 99.91 | Slight | Do. |
| E | 1 | 6,970 | | None | Do. |
|   | 2 | 55 | 99.2 | do | Do. |
|   | 3 | 46 | 99.3 | do | Do. |
|   | 4 | Absent | | | |
|   | 5 | Absent | | | |

[1] Staining, when present, appeared only after the third wash of the day.
[2] Subject contaminated hands between surgical scrub and bland soap sampling scrub.

TABLE V.—COMMERICAL PRODUCT A

| Subject | Day | Basin Water, Organisms per 10 milliliters | Percent Reduction | Staining [5] | Irrigation |
|---|---|---|---|---|---|
| A | 1 | 3,206 | | None | None. |
|   | 2 | 152 | 95.3 | do | Do. |
|   | 3 | 94 | 97.1 | do | Do. |
|   | 4 | 168 | 94.8 | do | Do. |
|   | 5 | 145 | 95.5 | do | Do. |
| F | 1 | 6,800 | | do | Do. |
|   | 2 | 352 | 94.8 | do | Do. |
|   | 3 | 50 | 99.3 | do | Do. |
|   | 4 | 106 | 98.4 | do | Do. |
|   | 5 | 720 | 89.4 | do | Slight. |
| G | 1 | 580 | | do | None. |
|   | 2 | 80 | 86.2 | do | Do. |
|   | 3 | 22 | 96.2 | do | Do. |
|   | 4 | 6 | 99.0 | do | Do. |
|   | 5 | 1 | 99.8 | do | Do. |
| D | 1 | 3,180 | | do | Do. |
|   | 2 | 120 | 96.2 | do | Do. |
|   | 3 | 69 | 97.8 | do | Do. |
|   | 4 | 60 | 98.1 | do | Do. |
|   | 5 | 144 | 95.5 | do | Do. |
| E | 1 | 11,900 | | do | Do. |
|   | 2 | 256 | 97.9 | do | Do. |
|   | 3 | 850 | 92.9 | do | Do. |
|   | 4 | 1,570 | 86.8 | do | Do. |
|   | 5 | Absent | | | |
| H | 1 | 6,900 | | None | None. |
|   | 2 | 246 | 96.4 | do | Do. |
|   | 3 | 72 | 99.0 | do | Do. |
|   | 4 | 57 | 99.2 | do | Do. |
|   | 5 | 69 | 99.0 | do | Do. |

TABLE VI.—AVERAGE PERCENT REDUCTIONS

| Day | Formula 37B (from Table IV) | Commercial Product A (from Table V) |
|---|---|---|
| 2 | [1] 95.4 (97.0) | 94.5 |
| 3 | 99.4 | 97.1 |
| 4 | 99.6 | 96.1 |
| 5 | 99.7 | 95.8 |

[1] If subject who contaminated his hands (see footnote 2, Table IV) is eliminated, the parenthetical reduction figure is obtained.

What is claimed is:

1. A germicidal complex of iodine with an anionic surface active agent of the formula:

$$RCH_2O(CH_2CH_2O)_nSO_3X$$

wherein:

R is hydrocarbon alkyl containing from about 7 to about 19 carbon atoms;

n is a positive number of from about 2 to about 30; and

X is a cation selected from the group consisting of alkali metal ion, ammonium ion, triethanolamine ion and mixtures thereof; said complex containing from about 0.1 to about 30 percent by weight of iodine based on the weight of said surface active agent.

2. Composition as defined in claim 1 wherein R contains from about 9 to about 15 carbon atoms.

3. Composition as defined in claim 1 wherein R is lauryl.

4. Composition as defined in claim 1 wherein n is about 2 to about 10.

5. Composition as defined in claim 1 wherein n is about 3.

6. Composition as defined in claim 1 wherein R is lauryl, n is about 3 and X is ammonium ($NH_4^+$).

7. Composition comprising the germicidal complexes of iodine with a mixture of:

(A) an anionic surface active agent of the formula:

$$RCH_2O(CH_2CH_2O)_nSO_3X$$

wherein:

R is hydrocarbon alkyl containing from about 7 to about 19 carbon atoms;

n is a positive number of from about 2 to about 30; and

X is a cation selected from the group consisting of alkali metal ion, ammonium ion, triethanolamine ion and mixtures thereof; said complex containing from about 0.1 to about 30 percent by weight of iodine based on the weight of said surface active agent, and (B) from about 2 to about 10 parts by weight, based on the weight of the said anionic surface active agent a polyoxyethylene sorbitan fatty acid ester containing an average of from about 10 to about 50 oxyethylene $(OCH_2CH_2)$ groups per molecule and wherein the acid moiety of said ester is derived from a fatty acid containing from about 8 to about 18 carbon atoms; said esteriodine complex containing from about 0.1 to about 30 percent by weight of iodine based on the weight of said ester.

8. Composition as defined in claim 7 wherein R contains from about 9 to about 15 carbon atoms, and said fatty acid contains from about 10 to about 14 carbon atoms.

9. Composition as defined in claim 7 wherein R is lauryl and said acid is lauric.

10. Composition as defined in claim 7 wherein n is 2 to about 10 and wherein said ester contains an average of from about 15 to about 30 oxyethylene $(CH_2CH_2O)$ groups.

11. Composition as defined in claim 7 wherein n is about 3 and said ester contains an average of about 20 oxyethylene $(CH_2CH_2O)$ groups.

12. Composition as defined in claim 7 wherein R is lauryl, n is about 3, X is ammonium ($NH_4^+$) and said ester is a lauric acid ester containing an average of about 20 oxyethylene $(CH_2CH_2O)$ groups.

13. Composition as defined in claim 12 containing from about 3 to about 5 parts of said ester (B) per part by weight of anionic surface active agent (A).

References Cited by the Examiner

UNITED STATES PATENTS

| 1,970,578 | 8/1934 | Schoeller. | |
| 2,931,777 | 4/1960 | Shelanski | 167—70 |
| 2,977,278 | 3/1961 | Shelanski | 167—17 |
| 3,039,916 | 6/1962 | Neracher | 167—17 |

OTHER REFERENCES

Reddish: Antiseptics, Disinfectants, Fungicides, and Sterilization (1954), Lea and Febiger, Philadelphia, Pa., p. 195.

JULIAN S. LEVITT, *Primary Examiner.*

S. J. FRIEDMAN, *Asistant Examiner.*